(12) United States Patent
Wittkopp et al.

(10) Patent No.: US 7,704,180 B2
(45) Date of Patent: Apr. 27, 2010

(54) MULTI-SPEED TRANSMISSION

(75) Inventors: Scott H. Wittkopp, Ypsilanti, MI (US);
James M. Hart, Belleville, MI (US);
Andrew W. Phillips, Saline, MI (US);
Clinton E. Carey, Monroe, MI (US);
Madhusudan Raghavan, West Bloomfield, MI (US)

(73) Assignee: GM Global Technology Operations Inc., Detroit, MI (US)

( * ) Notice: Subject to any disclaimer, the term of this patent is extended or adjusted under 35 U.S.C. 154(b) by 349 days.

(21) Appl. No.: 11/954,862

(22) Filed: Dec. 12, 2007

(65) Prior Publication Data

US 2008/0171628 A1    Jul. 17, 2008

Related U.S. Application Data

(60) Provisional application No. 60/879,956, filed on Jan. 11, 2007.

(51) Int. Cl.
*F16H 3/62* (2006.01)
(52) U.S. Cl. .................... 475/275; 475/276
(58) Field of Classification Search ......... 475/275–278, 475/284
See application file for complete search history.

(56) References Cited

U.S. PATENT DOCUMENTS

| | | |
|---|---|---|
| 6,176,803 B1 | 1/2001 | Meyer |
| 6,342,026 B1 | 1/2002 | Takagi |
| 6,547,688 B2 | 4/2003 | Takagi |
| 6,558,287 B2 | 5/2003 | Hayabuchi et al. |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Lee |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |
| 6,984,187 B2 | 1/2006 | Biermann |
| 6,991,578 B2 | 1/2006 | Ziemer |
| 7,011,597 B2 | 3/2006 | Haka |
| 7,014,589 B2 | 3/2006 | Stevenson |
| 7,018,319 B2 | 3/2006 | Ziemer |
| 7,101,305 B2 | 9/2006 | Tabata et al. |
| 7,128,683 B2 | 10/2006 | Oguri |
| 7,163,484 B2 | 1/2007 | Klemen |

(Continued)

FOREIGN PATENT DOCUMENTS

DE    102005032001 A1    2/2007

*Primary Examiner*—Ha D. Ho

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

15 Claims, 2 Drawing Sheets

U.S. PATENT DOCUMENTS

| | | | |
|---|---|---|---|
| 7,527,576 B2 * | 5/2009 | Kamm et al. | 475/284 |
| 7,582,040 B2 * | 9/2009 | Kamm et al. | 475/282 |
| 7,597,646 B2 * | 10/2009 | Kamm et al. | 475/277 |
| 7,621,840 B2 * | 11/2009 | Kamm et al. | 475/275 |
| 7,632,207 B2 * | 12/2009 | Kamm et al. | 475/278 |
| 7,635,315 B2 * | 12/2009 | Kamm et al. | 475/278 |
| 7,645,207 B2 * | 1/2010 | Kamm et al. | 475/275 |
| 7,645,208 B2 * | 1/2010 | Kamm et al. | 475/275 |
| 2005/0090362 A1 | 4/2005 | Abe et al. | |
| 2006/0019791 A1 | 1/2006 | Baldwin | |
| 2006/0270513 A1 | 11/2006 | Klemen | |
| 2006/0270514 A1 | 11/2006 | Oguri | |
| 2006/0270516 A1 | 11/2006 | Klemen | |

\* cited by examiner

| GEAR STATE | GEAR RATIO | RATIO STEP | TORQUE TRANSMITTING ELEMENTS | | | | |
|---|---|---|---|---|---|---|---|
| | | | 34 | 32 | 30 | 26 | 28 |
| REV | -2.400 | | X | X | | | X |
| N | | -0.52 | | | | | |
| 1st | 4.600 | | X | X | | X | |
| 2nd | 3.067 | 1.50 | X | X | X | | |
| 3rd | 2.091 | 1.47 | | X | X | X | |
| 4th | 1.667 | 1.25 | | X | X | | X |
| 5th | 1.313 | 1.27 | | X | | X | X |
| 6th | 1.000 | 1.31 | | | X | X | X |
| 7th | 0.820 | 1.22 | X | | | X | X |
| 8th | 0.667 | 1.23 | X | | X | | X |

X = ON, CARRYING TORQUE

FIG. 3

MULTI-SPEED TRANSMISSION

CROSS-REFERENCE TO RELATED APPLICATIONS

This application claims the benefit of U.S. Provisional Application No. 60/879,956 filed on Jan. 11, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes an input member, an output member, first, second, third and fourth planetary gear sets each having first, second and third members, a first interconnecting member continuously interconnecting the first member of the first planetary gear set with the first member of the second planetary gear set, a second interconnecting member continuously interconnecting the third member of the first planetary gear set with the first member of the fourth planetary gear set, a third interconnecting member continuously interconnecting the second member of the second planetary gear set with the third member of the third planetary gear set, and a fourth interconnecting member continuously interconnecting the second member of the third planetary gear set with the third member of the fourth planetary gear set. Five torque transmitting mechanisms are selectively engageable to interconnect one of the first, second, and third members with another of the first, second, third members, and a stationary element. The torque transmitting mechanisms are selectively engageable in combinations of at least three to establish at least eight forward speed ratios and at least one reverse speed ratio between the input member and the output member.

In one aspect of the present invention, a first of the five torque transmitting mechanisms is selectively engageable to interconnect the second member of the first planetary gear set with the first member of the third planetary gear set.

In another aspect of the present invention, a second of the five torque transmitting mechanisms is selectively engageable to interconnect the second member of the fourth planetary gear set with at least one of the second member of the second planetary gear set and the third member of the third planetary gear set.

In yet another aspect of the present invention, a third of the five torque transmitting mechanisms is selectively engageable to interconnect the first member of the fourth planetary gear set with the first member of the third planetary gear set.

In yet another aspect of the present invention, a fourth of the five torque transmitting mechanisms is selectively engageable to interconnect the first member of the second planetary gear set with the stationary element.

In yet another aspect of the present invention, a fifth of the five torque transmitting mechanisms is selectively engageable to interconnect the third member of the second planetary gear set with the stationary element.

In yet another aspect of the present invention, the first members are sun gears, the second members are carrier members, and the third members are ring gears.

In yet another aspect of the present invention, the input member is continuously interconnected with the second member of the first planetary gear set and wherein the output member is continuously interconnected with the second member of the third planetary gear set.

In yet another aspect of the present invention, two of the torque transmitting mechanisms are brakes and three of the torque transmitting mechanisms are clutches.

In yet another aspect of the present invention, the stationary element is a transmission housing.

Another embodiment of the transmission includes an input member, an output member, first, second, third and fourth planetary gear sets each having a sun gear, a carrier member, and a ring gear, wherein the input member is continuously interconnected to the carrier member of the first planetary gear set and wherein the output member is continuously interconnected to the carrier member of the third planetary gear set, a first interconnecting member continuously interconnecting the sun gear of the first planetary gear set with the sun gear of the second planetary gear set, a second interconnecting member continuously interconnecting the ring gear of the first planetary gear set with the sun gear of the fourth planetary gear set, a third interconnecting member continuously interconnecting the carrier member of the second planetary gear set with the ring gear of the third planetary gear set, and a fourth interconnecting member continuously interconnecting the carrier member of the third planetary gear set with the ring gear of the fourth planetary gear set. A first torque transmitting mechanism is selectively engageable to interconnect the carrier member of the first planetary gear set with the sun gear of the third planetary gear set, a second torque transmitting mechanism is selectively engageable to interconnect the carrier member of the fourth planetary gear set with at least one of the carrier member of the second planetary gear set and the ring gear of the third planetary gear set, a third torque transmitting mechanism is selectively engageable to interconnect the sun gear of the fourth planetary gear set with the sun gear of the third planetary gear set, a fourth torque transmitting mechanism is selectively engageable to interconnect the sun gear of the second planetary gear set with the stationary element, and a fifth torque transmitting mechanism is selectively engageable to interconnect the ring gear of the second planetary gear set with the stationary element. The torque transmitting mechanisms are selectively engageable in combinations of at least three to establish at least eight forward speed ratios and at least one reverse speed ratio between the input member and the output member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that the eight speed automatic transmission of the present invention has an arrangement of permanent mechanical connections between the elements of the four planetary gear sets in common. These mechanical connections generically link or relate transmission embodiments. A first component or element of a first planetary gear set is permanently coupled to a first component or element of a second planetary gear set. A second component or element of the first planetary gear set is permanently coupled to a first component or element of a third planetary gear set. A second component or element of the second planetary gear set is permanently coupled to a first component or element of a fourth planetary gear set. Finally, a second component or element of the third planetary gear set is permanently coupled to a second component or element of the fourth planetary gear set.

Figure 1:
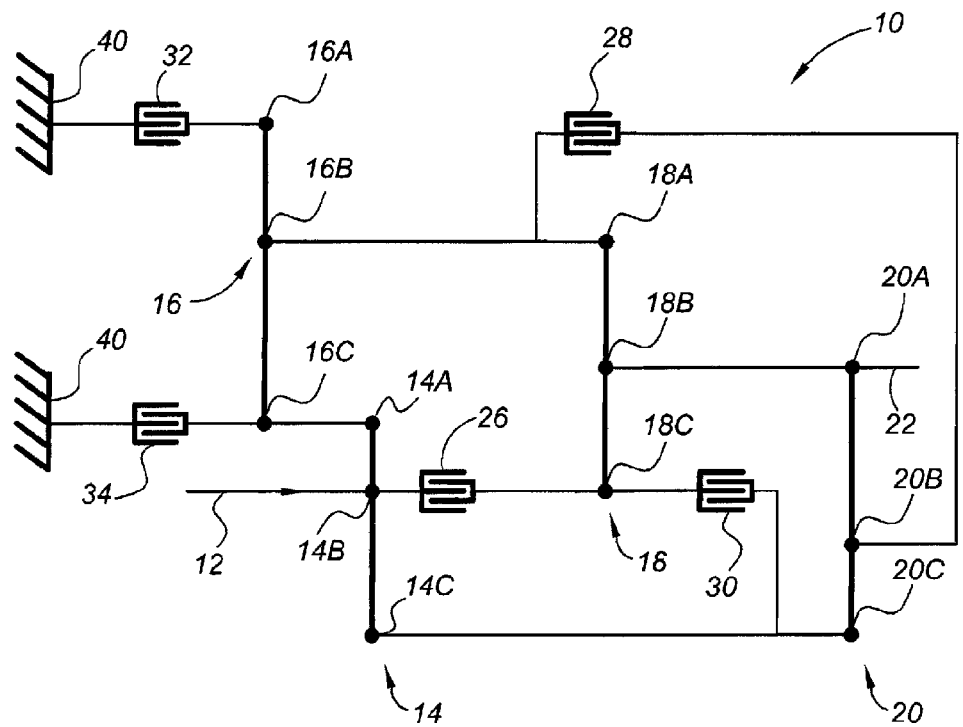
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input 12 is coupled to the second node 14B of the first planetary gear set 14. The output 22 is coupled to the first node 20A of the fourth planetary gear set 20. The first node 14A of the first planetary gear set 14 is coupled to the third node 16C of the second planetary gear set 16. The third node 14C of the first planetary gear set 14 is coupled to the third node 20C of the fourth planetary gear set 20. The second node 16B of the second planetary gear set 16 is coupled to the first node 18A of the third planetary gear set 18. The second node 18B of the third planetary gear set 18 is coupled to the first node 20A of the fourth planetary gear set 20.

A first clutch 26 selectively connects the second node 14B of the first planetary gear set 14 to the third node 18C of the third planetary gear set 18. A second clutch 28 selectively connects the second node 16B of the second planetary gear set 16 and the first node 18A of the third planetary gear set 18 to the second node 20B of the fourth planetary gear set 20. A third clutch 30 selectively connects the third node 18C of the third planetary gear set 18 to the third node 14C of the first planetary gear set 14 and to the third node 20C of the fourth planetary gear set 20. A first brake 32 selectively connects the first node 16A of the second planetary gear set 16 to a ground, stationary element, or a transmission housing 40. A second brake 34 selectively connects the third node 16C of the second planetary gear set 16 to a ground, stationary element, or the transmission housing 40.

Figure 2:
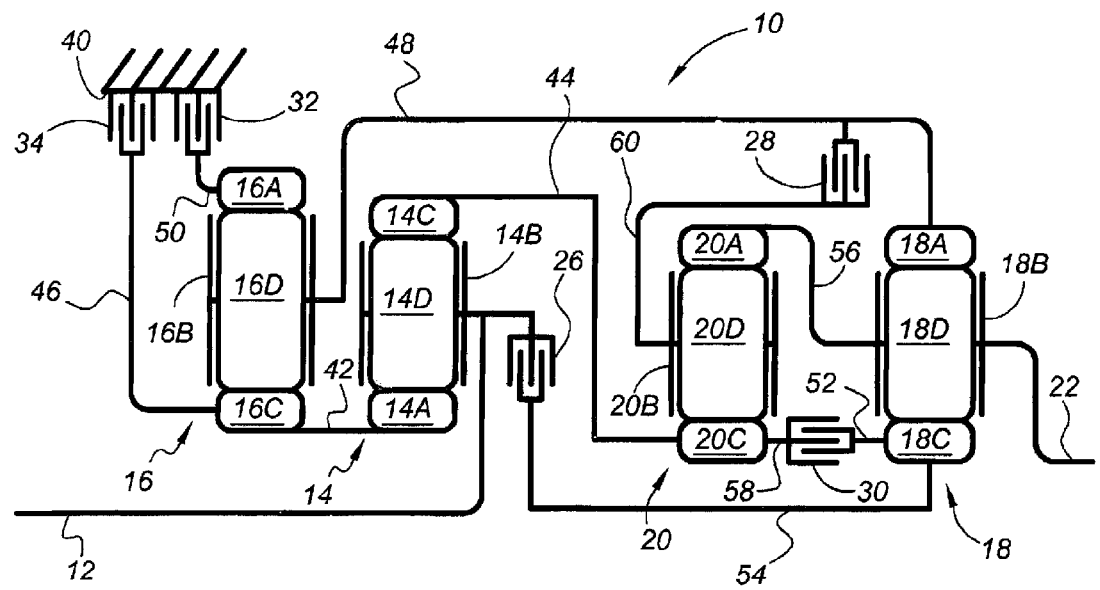
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a planet gear carrier member 14B that rotatably supports a set of planet gears 14D, and a ring gear member 14C. The planet gears 14D are each configured to intermesh with both the sun gear member 14A and the ring gear member 14C. The sun gear member 14A is connected for common rotation with a first shaft or interconnecting member 42. The planet gear carrier member 14B is connected for common rotation with the input member 12. The ring gear member 14C is connected for common rotation with a second shaft or interconnecting member 44.

The second planetary gear set 16 includes a sun gear member 16C, a planet carrier member 16B that rotatably supports a set of intermeshing planet gears 16D, and a ring gear member 16A. The planet gears 16D are each configured to intermesh with both the sun gear member 16C and the ring gear member 16A. The sun gear member 16C is connected for common rotation with a third shaft or interconnecting member 46 and with the first interconnecting member 42. The planet carrier member 16B is connected for common rotation with a fourth shaft or interconnecting member 48. The ring gear member 16A is connected for common rotation with a fifth shaft or interconnecting member 50.

The third planetary gear set 18 includes a sun gear member 18C, a planet carrier member 18B that rotatably supports a set of planet gears 18D, and a ring gear member 18A. The planet gears 18D are configured to intermesh with the sun gear member 18C and the ring gear member 18A. The sun gear member 18C is connected for common rotation with a sixth shaft or interconnecting member 52 and a seventh shaft or interconnecting member 54. The planet carrier member 18B is connected for common rotation with the output member 22 and with an eighth shaft or interconnecting member 56. The ring gear member 18A is connected for common rotation with the fourth interconnecting member 48.

The fourth planetary gear set 20 includes a sun gear member 20C, a planet carrier member 20B that rotatably supports a set of planet gears 20D, and a ring gear member 20A. The planet gears 20D are each configured to intermesh with both the sun gear member 20C and the ring gear member 20A. The sun gear member 20C is connected for common rotation with the second interconnecting member 44 and with a ninth shaft or interconnecting member 58. The planet carrier member 20B is connected for common rotation with a tenth shaft or interconnecting member 60. The ring gear member 20A is connected for common rotation with the eighth interconnecting member 56.

The input shaft or member 12 is preferably continuously connected to an engine (not shown) or to a turbine of a torque converter (not shown). The output shaft or member 22 is preferably continuously connected with a final drive unit or transfer case (not shown).

The torque-transmitting mechanisms or clutches 26, 28, 30 and the brakes 32, 34 allow for selective interconnection of the shafts or interconnecting members, members of the planetary gear sets and the transmission housing 40. For example, the first clutch 26 is selectively engageable to connect the input member 12 to the seventh interconnecting member 54. The second clutch 28 is selectively engageable to connect the fourth interconnecting member 48 to the tenth interconnecting member 60. The third clutch 30 is selectively engageable to connect the sixth interconnecting member 52 to the ninth interconnecting member 58. The first brake 32 is selectively engageable to connect the fifth interconnecting member 50 to ground or the transmission housing 40 in order to restrict rotation of the ring gear 16A relative to the ground or the transmission housing 40. The second brake 34 is selectively engageable to connect the third interconnecting member 46 to the ground or the transmission housing 40 to restrict rotation of the sun gear 16C and the sun gear 14A relative to the ground or the transmission housing 40.

Referring now to FIGS. 2 and 3, the operation of the embodiment of the eight speed transmission 10 will be described. It will be appreciated that the transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, and second brake 34), as will be explained below. FIG. 3 is a truth table presenting the various combinations of torque transmitting mechanisms or elements that are activated or engaged to achieve the various gear states. Actual numerical gear ratios and gear steps of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 32, the second brake 34, and the second clutch 28 are engaged or activated. The first brake 32 connects the fifth interconnecting member 50 to ground or the transmission housing 40 in order to restrict rotation of the ring gear 16A relative to the ground or the transmission housing 40. The second brake 34 connects the third interconnecting member 46 to the ground or the transmission housing 40 to restrict rotation of the sun gear 16C and the sun gear 14A relative to the ground or the transmission housing 40. The second clutch 28 connects the fourth interconnecting member 48 to the tenth interconnecting member 60. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and the brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members, wherein the output member is continuously interconnected with the second member of the third planetary gear set;
a first interconnecting member continuously interconnecting the first member of the first planetary gear set with the first member of the second planetary gear set;
a second interconnecting member continuously interconnecting the third member of the first planetary gear set with the first member of the fourth planetary gear set;
a third interconnecting member continuously interconnecting the second member of the second planetary gear set with the third member of the third planetary gear set;
a fourth interconnecting member continuously interconnecting the second member of the third planetary gear set with the third member of the fourth planetary gear set; and
five torque transmitting mechanisms selectively engageable to interconnect one of the first, second, and third members with another of the first, second, third members, and a stationary element, and
wherein the torque transmitting mechanisms are selectively engageable in combinations of at least three to establish at least eight forward speed ratios and at least one reverse speed ratio between the input member and the output member.

2. The transmission of claim 1 wherein a first of the five torque transmitting mechanisms is selectively engageable to interconnect the second member of the first planetary gear set with the first member of the third planetary gear set.

3. The transmission of claim 2 wherein a second of the five torque transmitting mechanisms is selectively engageable to interconnect the second member of the fourth planetary gear set with at least one of the second member of the second planetary gear set and the third member of the third planetary gear set.

4. The transmission of claim 3 wherein a third of the five torque transmitting mechanisms is selectively engageable to interconnect the first member of the fourth planetary gear set with the first member of the third planetary gear set.

5. The transmission of claim 4 wherein a fourth of the five torque transmitting mechanisms is selectively engageable to interconnect the first member of the second planetary gear set with the stationary element.

6. The transmission of claim 5 wherein a fifth of the five torque transmitting mechanisms is selectively engageable to interconnect the third member of the second planetary gear set with the stationary element.

7. The transmission of claim 1 wherein the first members are sun gears, the second members are carrier members, and the third members are ring gears.

8. The transmission of claim 1 wherein the input member is continuously interconnected with the second member of the first planetary gear set.

9. The transmission of claim 1 wherein two of the torque transmitting mechanisms are brakes and three of the torque transmitting mechanisms are clutches.

10. The transmission of claim 1 wherein the stationary element is a transmission housing.

11. A transmission comprising:
    an input member;
    an output member;
    first, second, third and fourth planetary gear sets each having first, second and third members, wherein the input member is continuously interconnected to the second member of the first planetary gear set and wherein the output member is continuously interconnected to the second member of the third planetary gear set;
    a first interconnecting member continuously interconnecting the first member of the first planetary gear set with the first member of the second planetary gear set;
    a second interconnecting member continuously interconnecting the third member of the first planetary gear set with the first member of the fourth planetary gear set;
    a third interconnecting member continuously interconnecting the second member of the second planetary gear set with the third member of the third planetary gear set;
    a fourth interconnecting member continuously interconnecting the second member of the third planetary gear set with the third member of the fourth planetary gear set;
    a first torque transmitting mechanism selectively engageable to interconnect the second member of the first planetary gear set with the first member of the third planetary gear set;
    a second torque transmitting mechanism selectively engageable to interconnect the second member of the fourth planetary gear set with at least one of the second member of the second planetary gear set and the third member of the third planetary gear set;
    a third torque transmitting mechanism selectively engageable to interconnect the first member of the fourth planetary gear set with the first member of the third planetary gear set;
    a fourth torque transmitting mechanism selectively engageable to interconnect the first member of the second planetary gear set with the stationary element; and
    a fifth torque transmitting mechanism selectively engageable to interconnect the third member of the second planetary gear set with the stationary element, and
    wherein the torque transmitting mechanisms are selectively engageable in combinations of at least three to establish at least eight forward speed ratios and at least one reverse speed ratio between the input member and the output member.

12. The transmission of claim 11 wherein the first members are sun gears, the second members are carrier members, and the third members are ring gears.

13. The transmission of claim 12 wherein the stationary element is a transmission housing.

14. A transmission comprising:
    an input member;
    an output member;
    first, second, third and fourth planetary gear sets each having a sun gear, a carrier member, and a ring gear, wherein the input member is continuously interconnected to the carrier member of the first planetary gear set and wherein the output member is continuously interconnected to the carrier member of the third planetary gear set;
    a first interconnecting member continuously interconnecting the sun gear of the first planetary gear set with the sun gear of the second planetary gear set;
    a second interconnecting member continuously interconnecting the ring gear of the first planetary gear set with the sun gear of the fourth planetary gear set;
    a third interconnecting member continuously interconnecting the carrier member of the second planetary gear set with the ring gear of the third planetary gear set;
    a fourth interconnecting member continuously interconnecting the carrier member of the third planetary gear set with the ring gear of the fourth planetary gear set;
    a first torque transmitting mechanism selectively engageable to interconnect the carrier member of the first planetary gear set with the sun gear of the third planetary gear set;
    a second torque transmitting mechanism selectively engageable to interconnect the carrier member of the fourth planetary gear set with at least one of the carrier member of the second planetary gear set and the ring gear of the third planetary gear set;
    a third torque transmitting mechanism selectively engageable to interconnect the sun gear of the fourth planetary gear set with the sun gear of the third planetary gear set;
    a fourth torque transmitting mechanism selectively engageable to interconnect the sun gear of the second planetary gear set with the stationary element; and
    a fifth torque transmitting mechanism selectively engageable to interconnect the ring gear of the second planetary gear set with the stationary element, and
    wherein the torque transmitting mechanisms are selectively engageable in combinations of at least three to establish at least eight forward speed ratios and at least one reverse speed ratio between the input member and the output member.

15. The transmission of claim 14 wherein the stationary element is a transmission housing.

* * * * *